March 4, 1941.    C. M. HECK    2,234,122

METHOD OF CONTROLLING THE TEMPERATURE OF OBJECTS

Filed Aug. 29, 1938

Inventor
CHARLES M. HECK
By
Attorney

Patented Mar. 4, 1941

2,234,122

UNITED STATES PATENT OFFICE 2,234,122

METHOD OF CONTROLLING THE TEMPERATURE OF OBJECTS

Charles M. Heck, Raleigh, N. C.

Application August 29, 1938, Serial No. 227,441

14 Claims. (Cl. 250—83)

This invention is a method and means for the concentration, or the dissipation of radiant heat, or the shielding of objects from such heat. The invention more directly relates to the art of heating and cooling bodies by radiation, and is useful in the process of heating, cooling or shielding bodies in radiant heat exchanges, or in the art of measuring radiation reaching one point from any other point or space.

One of the objects of the invention is to provide a highly efficient method of directing the exchange of radiant heat between a space and a body or surface. Another object of the invention is to provide a method and means whereby the total radiation reaching a body from one direction, or leaving said body in the opposite direction, is made a maximum, or the radiation reaching the body from any other direction or leaving the same in the opposite direction is made a minimum.

The invention will be hereinafter fully set forth and particularly pointed out in the claims.

Figure 1:
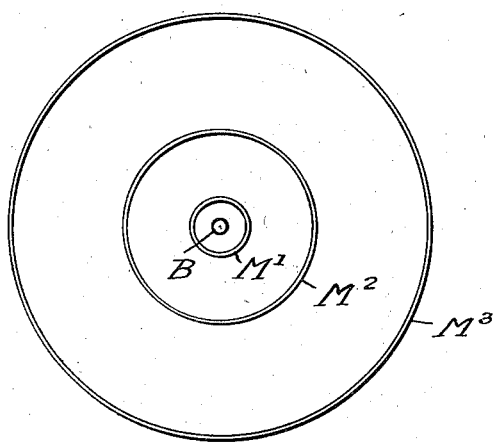
Figure 3:
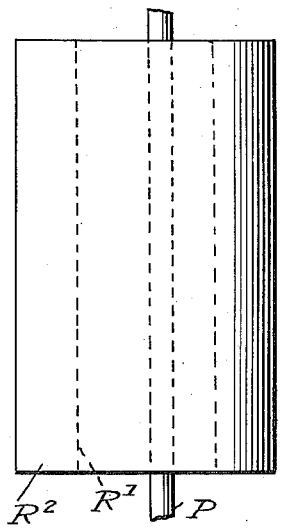
Figure 2:
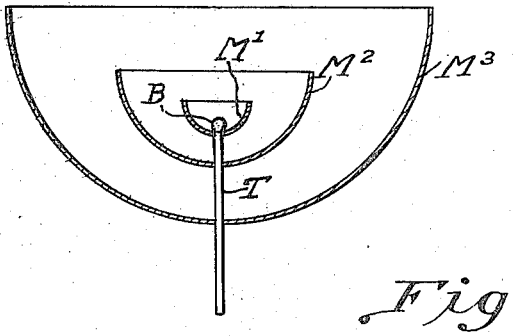
Figure 4:
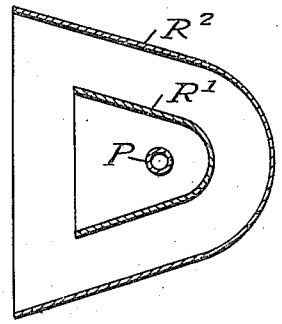
Figure 5:

In the accompanying drawing:

Figure 1 is a top plan view and Figure 2 is a vertical sectional view illustrating an instrument for recording temperatures of a distantly located space. Figures 3 and 4 are side and transverse cross sectional views of a device for applying the method of the invention to a pipe or conduit. Figure 5 is a diagrammatic end view showing a battery of connected devices of semi-circular section, as illustrated in Figure 4, and arranged in the same plane.

Referring to Figures 1 and 2, B designates the body which is to be subjected to changes in temperature, and is axially located with respect to a circular mirror M'. At a lower position on the member T, and spaced from the mirror M' is a second mirror $M^2$ of larger diameter. If desired, any number of additional mirrors of progressively increasing diameter may be employed. For purposes of illustration, a third and larger mirror $M^3$ is shown, the same being similarly spaced from the mirror $M^2$ along the member T. The mirrors are concentric and of approximately hemispherical form, each of the smaller mirrors being located well below the edge of the next larger mirror, so as to be enclosed by the latter, the mirrors M' and $M^2$ being enclosed by the mirror $M^3$.

In operation, assuming B to be a portion of a thermometer, heat radiation leaves the bulb B, going directly toward a colder space located in the vicinity of the series or battery of mirrors. Radiation also leaves in directions to strike the inner concave surface of the mirror M', in such manner as to be reflected outwardly toward the same space. Conversely, heat from the colder space is radiated directly to B and also reflected from the interior of the mirror M' to the bulb B. The temperature that B will reach is conditioned by its difference of temperature with respect to the cold space and by the actual temperature of the reflector M'. Should the mirror M' have a temperature higher than the colder space, due to the contact of said mirror M' on the outer or convex side with the atmosphere and radiation reaching it through the atmosphere, the reflector M' becomes a source of heat and will radiate said heat to the bulb B, and therefore prevent the bulb B from reaching as low a temperature as it would have normally acquired in the exchange of radiation with the colder space. To neutralize this interfering thermal radiation, the mirror M' is placed within a second larger mirror $M^2$, so that radiation from the colder space in the vicinity of the instrument is reflected by said mirror $M^2$ against the outer or convex surface of the smaller mirror M', and any radiation from said last mentioned outer surface of mirror M' is reflected from the interior surface of the mirror $M^2$ to the colder space. At the same time, the mirror $M^2$ protects the mirror M' from contact with the atmosphere outside of the mirror $M^2$ and from radiation from said atmosphere on the mirror M'. This results in the body of the mirror M' being cooled by the same method that the bulb B is cooled. In a like manner the larger mirror $M^3$ operates to cool and protect the smaller mirror $M^2$. As before intimated, still larger mirrors may be added outside of the mirror $M^3$ to continue the successive cooling of the mirrors within. Tests have shown that each added mirror to such a series makes the cooling effect on B by radiation to and from a colder space more efficient. Obviously, the temperature absorbed by the bulb B is indicated upon the scale of the thermometer.

The above described method applies also to the function of transferring the maximum amount of heat from a hot body positioned at B to a colder space above the series of mirrors. In this instance, the bulb B not only directs its radiation to the colder space as before, but heats up the body of the mirror M'. Under these circumstances, the mirror M' would normally become a source of radiation and convection, dissipating this absorbed heat in directions other than that of the cold space. The mirror $M^2$ then acts as a director of radiation from the back of the mirror M' toward the cold space above. Then the radiation from the mirror M' absorbed by mirror M², which would be lost from the back of mirror M², is reflected by the reflector M³ outwardly toward the colder space. Also the enclosing mirror makes for a minimum of dissipation by convection.

The same method operates to shield the bulb B from radiation that otherwise would arrive at the location of B from below as pictured in Figure 2. In this instance, the mirror M³ acts as a convex reflector reflecting heat away from the direction of B within it. However, the mirror M³ would have the temperature of its material more or less controlled by the outer atmosphere and general radiation reaching the outer surface of said mirror M³. Therefore, the heat radiated from the mirror M³, as a source of heat, toward B must be shielded from B by reflection by the back of the second mirror M². In like manner, the mirror M' protects the member B from any radiation originating in the mirror M². The result is that the element B is shielded in a positive manner from practically all radiation that otherwise would have reached said element through the surface described by the mirror M³. Tests show that the rise in temperature at B due to the radiation striking the back of mirror M³ in such a triple series, is insignicant. This shielding method may be applied to a surface in the same manner as here described for a body B, as explained later.

The modification illustrated in Figures 3 and 4 is another design of a device for applying this method of cooling, heating or shielding when the object to be affected is elongated, such as a pipe or conduit, through which fluids are caused to travel. These Figures represent the mirrors R' and R² as being of elongated or partly cylindrical form and partly surrounding an elongated pipe P. In this instance, the mirrors are shown as having parabolic form in the plane. The mirrors will function in identically the same manner as described in Figures 1 and 2.

Figure 5 diagrammatically illustrates a highly practical application of the structure illustrated in Figures 3 and 4. Referring to said Figure, it will be observed that a series of outer mirrors R² are connected in such manner as to provide a covering such as a roof, or a wall of a building, where insulation, heating or cooling features are desired. In this instance, the elements P may constitute a system of piping to be cooled or heated, or they may be entirely omitted. The mirrors R' are interposed between said pipes and the mirrors R². Should the pipes be omitted the mirrors operate to insulate a space, or to return to said space the heat that otherwise would have tended to leave it. It is to be understood that the whole surface above the plane of elements P may be insulated by the cooperative effects of mirrors R and R². If R' and R² form a surface of a house or a surface between the studding of a house, the curvature of the elements R² would reflect heat backwardly in such manner as to prevent transmission thereof into the house, and the mirrors R' and R² would operate by reflection to keep heat from passing outwardly from within the house to the outer side of R² more effectively, because of the curvatures of R' and R².

In operation, these devices are directed with the open end pointing in the direction of the exchange of radiation, or while insulating, the open end is pointed away from the radiation to be shielded from. When heating is desired the center of each element should be near the focus of the mirror that encloses it. When the object is to cool the center element B or P, as the case may be, each element may be placed deeper within its enclosing mirror than the focus of the mirror.

It is to be understood that the term "mirror" employed herein, is not limited to any specific material or structure but is intended to include any material or structure provided with reflecting surfaces.

Having thus explained the nature of the invention and described an operative manner of constructing and using the same, although without attempting to set forth all of the forms in which it may be made, or all of the forms of its use, what is claimed is:

1. A method of cooling a body, which comprises directing by reflection toward a cooler space, the radiation leaving said body, and directing by reflection toward the same cooler space radiation originating in the medium which produces the first mentioned reflection.

2. The method of changing the temperature of a body which comprises directing thermal radiation toward said body by placing it in a focal position with respect to a reflecting medium, and controlling radiation arising in said reflecting medium by placing the latter in the focal position of a second reflecting medium relative to said thermal radiation.

3. The method of changing the temperature of a body which comprises directing thermal radiation away from said body by placing it in a focal position with respect to a reflecting medium, and placing said reflecting medium in a focal position relative to a second reflecting medium in such manner as to direct radiation originating in the first reflecting medium away from first said medium in paths which are essentially parallel with the paths of the radiation being directed away from said body.

4. The method of directing radiation which comprises shielding a body by reflecting away from it a radiation which is directed toward it in all directions save one direction and shielding by reflection the first said shielding medium from radiation which is directed toward it in all save the said one direction and concentrating by reflection the radiation coming in said one direction on said body and first said shielding medium.

5. The method of shielding a body from radiation in all directions except one, which comprises reflecting away from a body the radiation that would otherwise reach it from all directions but said one direction and reflecting away from said body the radiation that would have reached it from the body of the first reflecting means due to its having absorbed radiation while reflecting.

6. In a device for the concentration of radiant heat, the combination of a series of essentially confocal uniaxial curved reflectors of increasing size, each having an outer convex and an inner concave surface, said reflectors positioned one within the other and spaced apart, each except the innermost reflecting surface of the series positioned to reflect radiation from the same source on the exterior surface of the reflector it encloses.

7. In a device for the concentration of radiant heat, the combination with a curved reflecting surface adapted to be directed toward a source of radiation, and one or more increasingly larger similarly curved reflector members partially enclosing the next smaller one, each having an inner and an outer surface and so relatively positioned that all of them may be directed toward said source of radiation and each except the innermost reflecting surface reflects onto the outer surface of the next enclosed reflector radiation from said source.

8. The combination with a thermally conductive body, a curved reflector having an inner and outer surface and positioned to direct radiation away from said body, and a second curved reflector positioned to direct radiation originating in the outer surface of the first mentioned reflector, said reflectors being so relatively positioned as to reflect said radiation in approximately parallel paths.

9. In combination, a plurality of relatively spaced curved reflector members each having an interior and exterior surface, said members being arranged side by side, and said interior surfaces curved to focus radiation from space on bodies partially enclosed by said interior surfaces, and a corresponding number of larger reflecting members respectively positioned essentially confocal with respect to the first mentioned reflecting members, to focus on said exterior surfaces said radiation, said larger reflecting members being fixedly joined at their edges.

10. The combination with a plurality of parallel pipes, of relatively spaced curved reflecting members one for each pipe and having a concave surface so positioned as to direct to space the radiation from its respective pipe, and a second series of larger curved reflecting members each positioned to direct radiation toward space from the outer surface of one of the first mentioned reflecting members, said larger reflecting members being joined at their side edges.

11. A method of controlling the temperature of a body, which comprises concentration by reflection radiation on said body from a source of thermal radiation, and controlling the temperature of the reflecting medium by concentrating through reflection on said medium in such manner as to place its radiation within the influence of the same source of thermal radiation.

12. The method of directing radiation which comprises focussing by reflection radiation from a source of varying intensity, upon an object, and focussing radiation from the same source upon a non-focussing surface of the first mentioned focussing means, so as to cause said focussing means to vary its temperature proportionately to variations of the temperature of said object.

13. The combination with a thermally conductive body, a curved mirror having an inner and an outer surface and so positioned as to direct radiation from said body falling on the inner surface of the mirror, and a second curved mirror so positioned as to direct away from the first mirror radiation which originates in the outer surface of the first mentioned mirror.

14. The combination with a thermally conductive body, a curved reflecting medium having an exterior convex and an interior concave surface positioned to direct radiation falling on the concave surface from said body to space, and a second curved reflecting medium positioned to direct away from the first said reflecting medium radiation from the exterior surface of the first mentioned reflecting medium, said reflecting media being of different sizes and located one within the other at relatively spaced positions.

CHARLES M. HECK.